United States Patent
Berlad et al.

(10) Patent No.: US 6,559,450 B1
(45) Date of Patent: May 6, 2003

(54) GAMMA CAMERA WITH TWO SEQUENTIAL CORRECTION MAPS

(75) Inventors: Gideon Berlad, Haifa; Naor Wainer, Zichron-Yaakov, both of (IL)

(73) Assignee: GE Medical Systems Israel, Ltd., Tirat-Hacarmel (IL)

(*) Notice: Subject to any disclaimer, the term of this patent is extended or adjusted under 35 U.S.C. 154(b) by 0 days.

(21) Appl. No.: 09/297,239

(22) PCT Filed: Jun. 29, 1997

(86) PCT No.: PCT/IL97/00217
§ 371 (c)(1),
(2), (4) Date: Apr. 26, 1999

(87) PCT Pub. No.: WO98/19179
PCT Pub. Date: May 7, 1998

(30) Foreign Application Priority Data

Oct. 27, 1996 (IL) .................................................. 119497

(51) Int. Cl.$^7$ .............................................. G01T 1/164
(52) U.S. Cl. .............................. 250/363.07; 250/363.09
(58) Field of Search .................. 250/363.07, 363.09

(56) References Cited

U.S. PATENT DOCUMENTS

| 4,424,446 A | 1/1984 | Inbar et al. |
| 4,588,897 A | 5/1986 | Inbar et al. |
| 5,285,072 A | 2/1994 | Klingenbeck-Regn et al. |
| 5,293,044 A | 3/1994 | Klingenbeck-Regn et al. |
| 5,449,897 A | 9/1995 | Bertelsen et al. |
| 5,576,548 A | * 11/1996 | Clarke et al. ............... 250/369 |
| 5,689,116 A | * 11/1997 | Heukensfeldt Jansen ................... 250/363.09 |

FOREIGN PATENT DOCUMENTS

| EP | 0 309 165 | 3/1989 |
| JP | 57 072087 | 5/1982 |
| WO | WO 98/23974 | 6/1998 |

* cited by examiner

*Primary Examiner*—Constantine Hannaher
(74) *Attorney, Agent, or Firm*—Fenster & Company Patent Attorneys, Ltd.

(57) ABSTRACT

A method of correcting errors in imaging data in a Gamma Camera including determining a first correction map based on one or both of (1) calculated corrections and (2) a first data acquisition, determining a second correction map based on a second data acquisition and correcting the imaging data based on the first and second correction maps. In a preferred embodiment of the invention, error correction is implemented using a neural network. Alternatively, a neural network can be used to perform the entire calculation of event position and/or energy.

54 Claims, 7 Drawing Sheets

GAMMA CAMERA WITH TWO SEQUENTIAL CORRECTION MAPS

RELATED APPLICATION

The present application is a US national phase application of PCT/IL97/00217, filed Jun. 29, 1997.

FIELD OF THE INVENTION

This application is related to precise distortion and error correction in Gamma Camera systems and in particular to incremental calibration thereof.

BACKGROUND OF THE INVENTION

FIG. 9 is a schematic illustration of an Anger camera. A subject 110 ingests, or is injected with, a radio-pharmaceutical, which tends to concentrate in certain body tissues, such as tissue 112. The local concentration depends on the particular radio-pharmaceutical, the tissue type and on its metabolic processes. Periodically, the radio-pharmaceutical generates a gamma photon. Although gamma photons are emitted in all directions, some of them travel along a straight path 114 and through a collimator 115 so that they might interact with a scintillator crystal 116. The interaction between the gamma photons and crystal 116 generates a shower of photons 118 in the visual light range. The number of secondary photons is directly dependent on the energy of the original gamma photon.

The number of photons 118 can be estimated by detecting these photons with a plurality of photo-multiplier tubes (PMT), such as tubes P1 to P4. The energy of the gamma event is then calculated by a position and energy calculator 126 which sums the contributions of all the individual PMTs. If the photon is scattered along its path from tissue 112 or if it is a cosmic ray photon, its energy will not be the same as the energy of a gamma photon as emitted by the radio-pharmaceutical. Thus, the number of photons 118 will also be different from those in "normal" interactions. By windowing the detected events, so that only events with an energy within a desired range are taken into account, events which do not form a portion of the image may be rejected.

A collimator 115, which is usually a fan collimator or a parallel-hole collimator is used to project the distribution of the radio-pharmaceutical in subject 110 onto detector crystal 116. The position of the interaction of the gamma photon on (or in) crystal 116 indicates the travel path 114, since collimator 115 limits the possible paths of a gamma photon from subject 110. This position is calculated by calculator 126. An accumulator 128 accumulates calculated interaction locations and builds an image therefrom, which is displayed on a display 130.

There are several known methods of calculating the interaction position, the most commonly used having been invented by Anger. In the Anger method, the determined interaction position is a weighted average of the positions of the PMTs which detect the interaction. the weighting being the number of photons detected by each PMT. There are several problems with this method. First, the sensitivity of the PMTs are not the same. Thus, a calculated position will tend to be displaced towards the position of the most sensitive PMT. Second, the sensitivity of PMTs changes with time, especially when an old PMT is replaced with a new one. Third, PMTs tend to be more sensitive at some angles than at others. Fourth, at the edges of crystal 116, some photons are lost, either by escaping the crystal or by there not being sufficient PMTs surrounding the interaction position from all directions. Fifth, different regions of crystal 116 differ in their sensitivity to gamma radiation and produce different amounts of light from an interaction of the same energy. Sixth, some portions of the crystal interact more strongly with the gamma radiation and thus generate a higher number of events for a fixed amount of radiation. Moreover, not only are position calculations inaccurate; as a second result of these problems, so are energy calculations. Seventh, the amount of light reaching the PMT is not linearly related to the distance of between the event and the PMT.

The results of these problems are generally classified as linearity errors—position determination is not exact; energy errors—energy determination is not exact; and sensitivity errors—the count of interactions at crystal 116 is not in a fixed proportion to the number of impinging photons.

One widely used methodology for correction of gamma cameras is the so-called "triple correction," versions of which are described in U.S. Pat. Nos. 4,424,446 and 4,588,897, the disclosures of which are incorporated herein by reference. These patents describe a correction system which corrects for geometric (dislocation) distortions, energy response variations and non-uniform sensitivity of the camera. Preferably, the sensitivity correction is performed after the other two corrections, which can be performed in any order. However, such calibration maps take a long time to prepare and must be individually created from scratch for each camera, camera-collimator combination and event energy.

In general, as disclosed in the two abovementioned patents and in other patents and publications, the camera is flooded by a source of radiation. For the determination of the energy correction, the spectra of a total signal associated with events at particular positions on the surface of the camera are acquired. An energy window corresponding to valid events is adjusted to account for the variations with position of the signal spectrum acquired. Alternatively, the signal is adjusted as a function of its position and the window remains constant. For geometric distortion correction, an image of a plate having holes at regularly spaced intervals is acquired. The measured hole positions are compared to the known spacings of the holes and a correction map, later applied to actual events during imaging, is determined. To correct for sensitivity, a flood field is applied to the gamma camera. A flood field image, which is acquired, is corrected for both distortion and energy. Remaining variations in the resulting image, which are the result of incomplete correction of the energy and dislocations errors, as well as intrinsic sensitivity variations of the camera and collimator, are used to form a normalization map which is applied to events or images after energy and dislocation corrections to correct for the sensitivity variations.

While many cameras perform triple correction on the imaging data, some cameras perform only one or two corrections.

In general, the determination of the correction maps is a fairly long and tedious process. This is caused by the fact that the data acquired in determining the corrections is based on individual events of relatively low frequency. The data generally has a substantial standard deviation of energy, position and sensitivity. Thus, in order to achieve the statistical accuracy necessary to correct the camera, a large number of events must be acquired at closely spaced positions on the camera This is especially true when large corrections must be made, in which case the number of events and the amount of time necessary to acquire them is especially large. Since, in general, camera correction maps must be periodically field updated, the camera is designed such that the amount of correction required is limited, by compromising the design of the camera. This limitation in the required correction reduces the amount of correction required and hence the time it takes to determine the correction.

A typical calibration time is about three days, For this reason, calibration is typically performed only about once a year.

The problem of calibration times is especially limiting for distortion and energy correction. It is well known that for best spatial resolution there is an optimal spacing between a scintillator plate and photodetectors used in a gamma camera. It is also well known that, at this optimal spacing, the amount of geometric distortion and the amount of energy correction required is very large. This would require determining correction at a large number of individual holes in order to assure accuracy over the entire face of the camera. Since the resolution of gamma cameras is limited, this would require acquiring a substantial number of images of relatively widely spaced holes, each image being shifted in both transverse directions to form the complete matrix required. In a highly distorted camera, the amount of data and the complexity of the correction are such that, in fact, it is not practical to correct for them. Thus, Gamma cameras are generally designed with less than optimal geometric resolution.

U.S. Pat. No. 5,293,044, describes a method for rapid localization of events using pattern matching. A pattern of PMT responses is serially compared to a stored set of PMT responses until a match is found, thereby defining the location of an event to which the PMTs responded. As can be appreciated, higher resolution of localization requires a greater number of stored PMT responses and more time to find an optimal match.

U.S. Pat. No. 5,285,072, describes an improvement of the U.S. Pat. No. 5,293,044 patent in which multiple simultaneous events are separated by matching the PMTs response to the events with generated combinations of PMT responses. The generated combinations are generated by combining at least two stored PMT responses.

SUMMARY OF THE INVENTION

It is an object of some embodiments of the present invention to provide a calibration method for a nuclear camera, in which a portion of the calibration process may be generalized for several cameras. In a preferred embodiment of the invention, recalibration of a camera after replacement of PMTs therein is a significantly shorter process than a complete calibration process.

The present invention, in one aspect thereof, seeks to provide a method for correction of Gamma cameras and other devices having similar correction requirements, in which the determination of a correction map, in the field, can be made more efficiently, for example, using fewer counts and/or with the acquisition of fewer images, so that the determination can be performed more quickly and easily, without loss of accuracy in the final image.

This method allows for designs having improved spatial resolution and accuracy and a reasonable requirement for in-field calibration.

The method is based on the understanding that at least the energy and spatial distortions of the camera can each be divided into two parts: a characteristic part and a specific part. The characteristic part does not vary significantly from camera to camera of a given design and/or does not change drastically with time for a given unit. The specific part may vary from camera to camera of a given design and/or with time for a particular camera. The characteristic part may be the result of the design or the construction of the particular camera. in either case the method contemplates the determination of either or both energy and dislocation corrections (and optionally the sensitivity correction) in two steps, a characteristic correction to correct for mainly intrinsic variations, including most of the errors and a specific correction to correct for errors, particular to a specific camera and/or to account for aging of the camera and/or a specific collimator and/or a specific energy range.

For a given detector configuration, the major portion of both energy and linearity distortion is usually caused by the common photomultiplier layout and other geometric attributes of the camera. A minor portion is related to specific system tolerances such as photomultiplier anisotropy, energy dependent average depth of photon interaction in the detector and other such causes. If the common major part is determined accurately, then the remaining camera specific part can be handled efficiently using lower count statistics and/or fewer images while providing the same or improved accuracy. This is true even if different cameras do not have the same exact geometric layout. in such a case, small geometrical differences between the layouts are corrected for as part of the minor correction. This method is most useful when the major portion of the distortion is common a group of cameras, however, this method also has utility when only a minor portion of the distortion is common to the cameras.

In one preferred embodiment of the invention, the sensitivity correction is divided into two (or three) parts. A first part is the portion of the correction which is specific to a particular collimator. This correction is determined for the collimator and is utilized by the camera whenever the particular collimator is used. Since this first part is camera independent, it does not need to be recalibrated for different cameras. The second portion of the correction is that caused by incomplete correction by the linearity and energy corrections, resulting in residual non-uniformity. Optionally, the sensitivity correction comprises a third portion which is caused by non-uniform sensitivity. of the scintillator crystal to incoming radiation. Alternatively, this portion may be included in the second portion. In a preferred embodiment of the invention, the first correction is determined separately of the camera on a per collimator basis. A flood image is first corrected for linearity and energy. The corrected flood is then used as the basis for a first sensitivity correction. The flood used for determining this correction can be acquired using a point source, giving a highly accurate correction. In use, this first correction is combined with the collimator correction to give an overall sensitivity correction. The advantage of this procedure is that a point source flood can be used to acquire the image needed for the first sensitivity correction, while a sheet source would be needed for determining the sensitivity correction, if the sensitivity is determined for the camera including the collimator. A sheet source flood is generally more difficult to perform and the radiation is generally less uniform, In particular, in one preferred embodiment of the invention, the characteristic energy correction and/or the dislocation correction are determined for a "typical" camera of a given design and construction. This determination may be based on either or both a calculation of expected distortions and a very high precision, high count mapping of one or more cameras.

Alternatively, or additionally, characteristic energy and/or dislocation corrections are determined with great precision at the factory and optionally during installation or after a major repair of the camera In either case, from time to time a second specific correction map (or maps) is determined based on the image (s) acquired as corrected by the characteristic maps. These specific correction maps make only relatively minor corrections in the images and hence need only be made using lesser statistics and/or lower spatial resolution than would be necessary in the absence of the characteristic maps. Optionally, when the amount of correction as determined for a specific correction map is greater than a given amount, the characteristic mapping process is carried out. The specific correction map is preferably determined using events as they are acquired. Alternatively, stored acquisition data may be used for off-line calibration.

Such specific correction maps may be acquired after minor repairs of the camera, such as replacing a PMT or with aging of the PMTs, which changes their operating characteristics.

In another aspect of the invention, changes in correction maps are adjusted with aging based on incremental corrections to previous maps. In this aspect of the invention, incremental corrections are determined based on old maps which are updated based on the determined incremental corrections. As a result, recalibrating the camera periodically to compensate for changing characteristics of the PMTs and the detector crystal is easier and/or faster.

In a preferred embodiment of the invention, calibration for a new collimator may be performed by first installing a supplied "first stage" calibration result and then proceeding directly to the second stage. Alternatively, as the collimator affects mostly the sensitivity errors, the additional calibration may be a third stage which is performed based on a supplied second stage.

Another aspect of the present invention relates to using a neural network (NN) instead of maps, to perform one or more steps of the above "triple step" correction method. A NN has the utility that it can be incrementally calibrated as described hereinabove.

A nuclear medicine camera in accordance with a preferred embodiment of the invention, uses a neural network (NN) for correcting linearity errors therein. Alternatively or additionally, the NN is also used for correcting energy errors. Additionally or alternatively, the NN is used to correct sensitivity errors.

In a preferred embodiment of the invention, a NN evaluates x, y and/or E and by-passes the Anger method. The NN is used to evaluate a function "f" which maps the PMT responses to the location (x, y) and the energy (E) of an event. Distortions and errors may be corrected by the NN or, alternatively, using maps, as known in the art.

In a preferred embodiment of the invention where the NN corrects linearity errors, the NN inputs preferably comprise an Anger calculated location (x, y) and the outputs of the NN preferably comprise a corrected location (x, y). During training, an additional input, a correct location (x, y) is preferably also used. Thus, the function f will typically be f(x, y)→(x', y').

In a preferred embodiment of the invention where the NN is used to perform the calculation of position and/or energy, the inputs preferably comprise the PMT data (integrated or raw) and the outputs preferably comprise a location (x, y) or a location and an energy (x, y, E). Thus, the function f may be f(PMT)→(x, y, E); f(PMT)→(x, y); f(PMT)→(E); or even f(PMT)→(x).

The NN is preferably operated in one of two modes, a learning mode, whereby the NN learns the characteristics of the camera and an output mode, whereby the NN generates corrected positions responsive to a PMT response set. The learning mode usually comprises two stages, a first, slow convergence stage where the NN learns the general characteristics of the function "f" and a second, fast conversion stage, where the NN fine-tunes to the particularities of the function "f". It should be noted that a significant portion of the slow convergence stage has to do with idiosyncrasies of a typical NN learning process and not on the distribution of the distortions between the characteristic and specific types of distortions.

In preferred embodiments of the present invention, using a NN corresponds to using. incremental correction maps as described herein, In one such embodiment, the first learning stage corresponds to the generation of the characteristic correction and the second stage corresponds to the generation of the specific correction. Alternatively or additionally, applying an incremental correction is achieved by continuing to train a fully trained NN with new stimuli.

In a preferred embodiment of the invention, a NN comprises a plurality of independent NNs, each of which has a single output (one of x, y and E). These independent NNs can be operated in parallel for a higher throughput.

In accordance with another preferred embodiment of the invention, a NN is used to separate two temporally close events. The NN is trained with both single events and with combinations of events. These combinations are preferably computer generated by adding the PMT responses of two real events. Preferably, when adding the responses, a model of the PMT response is used to compensate for non-linearities in the response of the PMT. Preferably, this multiple-event stage of learning is applied after the second stage of learning (for single events). Alternatively, the second stage and the multiple-event stage of learning are combined. In a preferred embodiment of the invention, only one of the multiple events is detected and the other is ignored. Alternatively, two such temporally close events are separated and detected. This requires that the NN have more than one set of x and y (and E) outputs. In a preferred embodiment of the invention, the NN detects Compton scattering events which occur inside the crystal. Preferably, the location of the event is determined to be the location of the higher energy event of two events which are deemed to be a Compton scatter event.

In a preferred embodiment of the invention, a NN has one or more classification outputs, which define the type of event, such as which energy window it belongs to, whether it is temporally overlapping event, a spatially overlapping event, a Compton scatter event or a multiple Compton scatter event. The classification output may be of a binary type, i.e., each individual classification output indicates belonging to a single classification or it may be a multi-values output, each value corresponding to a classification.

While the invention is described in the context of corrections for linearity, energy and sensitivity, it is also applicable to other corrections which can be divided into a fairly constant major portion and a relatively small variable portion, where the variable portion may comprise, at least in part, variations which may occur in the major portion.

There is therefore provided, in accordance with a preferred embodiment of the invention, a method of correcting errors in imaging data in a Gamma Camera comprising:

determining a first correction map based on one or both of
(1) calculated corrections and (2) a first data acquisition;

determining a second correction map based on a second data acquisition; and correcting the imaging data based on the first and second correction maps.

In a preferred embodiment of the invention, the first correction map is based on a first data acquisition. This map may be based, in a preferred embodiment of the invention, on data acquisitions made on a typical camera or on one or a plurality of "standard" gamma cameras. Alternatively or additionally, the first correction map comprises a combined correction map of at least two previous correction maps for a same type of error correction.

Alternatively or additionally, the first correction map and the second correction map are based on different photon energies. Thus, the first map can be acquired for a first photon energy and the second, fine tuning map, be acquired at the target photon energy. This method is also useful for converting a combined correction map for a first photon energy to a combined correction map for a second photon energy.

In a preferred embodiment of the invention, the first data acquisition is a relatively high count acquisition and the second acquisition is a relatively low count acquisition.

In a preferred embodiment of the invention, the first data acquisition is made at a relatively high spatial resolution and the second data acquisition is made at a relatively low spatial resolution.

In preferred embodiments of the invention, the first correction map is based on calculated corrections, or on both calculated corrections and a data acquisition.

In a preferred embodiment of the invention, the second correction map is determined periodically. Alternatively, or additionally, the second correction map is determined in response to perceived errors in an image produced by the camera. Alternatively or additionally, the second correction map is made after installation of the gamma camera.

In a preferred embodiment of the invention, the second correction map is determined without redetermining the first correction map.

In a preferred embodiment of the invention, the second correction map is combined with a prior correction map to determine a new correction map. In one preferred embodiment of the invention, the prior correction map is a prior second correction map and the new correction map is a new second correction map. Alternatively or additionally, the first and second correction maps are combined to form a combined correction map which is used to correct the acquired data In a preferred embodiment of the invention, the imaging data is corrected by a plurality of corrections which correct for different errors in the data and wherein the first and second correction maps are determined for at least one of the corrections. Preferably, the at least one correction comprises an energy correction. Alternatively or additionally, the at least one correction comprises a dislocation correction. Preferably, the at least one correction comprises a sensitivity correction. Alternatively, the corrections comprise a sensitivity correction determined on the basis of a single correction map.

In an embodiment of the invention, the at least one correction comprises a flood correction.

There is further provided, in accordance with a preferred embodiment of the invention, a method for correcting an acquired image on a gamma camera comprising: determining a first correction map to correct for characteristic distortions; determining a second correction map to correct for specific distortions; and correcting the acquired image based on the first and the second correction maps.

There is also provided in accordance with a preferred embodiment of the invention a nuclear medicine camera, comprising:

a radiation detector which detects radiation events which impinge on the detector; and a position and energy calculator which calculates at least one parameter of an interaction between an impinging radiation event and the detector, wherein the calculator comprises a neural network.

Preferably, the parameter comprises a position coordinate of the event. Further preferably, the neural network calculates a second position coordinate of the event, to yield a two-dimensional position estimate of the event.

Alternatively or additionally, the parameter comprises a classification of the event. Alternatively or additionally, the parameter comprises an. association of the event with an energy window. Alternatively or additionally, the parameter comprises an energy of the event.

Alternatively or additionally, said parameter is calculated responsive to a state of the camera. Preferably, the state of the camera is a rotational state of the detector.

Alternatively or additionally, the NN receives inputs from the detector, which inputs are not integrated over an event duration. Alternatively, the NN receives inputs from the detector, which inputs are integrated over an event duration.

In a preferred embodiment of the invention, the detector comprises a solid state detector. Alternatively or additionally, the detector comprises a plurality of photomultipliers.

In a preferred embodiment of the invention, the parameter is calculated by said calculator without an interaction with the neural network. Preferably, said parameter comprises a position parameter, calculated using a center of gravity calculation. Alternatively or additionally, the neural network corrects a calculation of said parameter, which parameter is previously calculated without an interaction with the neural network.

In a preferred embodiment of the invention, the neural network separates two temporally overlapping events. In one embodiment of the invention, the neural network outputs a parameter of only a single one of said two events.

In a preferred embodiment of the invention, the events are generated by a radiation source which radiates at a plurality of radiation energies.

Alternatively or additionally, the neural network identifies Compton scatter events.

There is also provided for in a preferred embodiment of the invention, a method of calibrating a position and energy calculation unit of nuclear medicine camera to calculate a parameter of a radiation event, comprising:

exposing the calculator to a first plurality of radiation events; and exposing the calculator to a second plurality of radiation events, wherein, at least one of said first and said second pluralities of radiation events comprises simulated responses to radiation events.

Preferably, exposing to simulating events comprises irradiating a PMT portion of the camera with light flashes, which correspond to the simulated events.

There is provided in accordance with another preferred embodiment of the invention, a method of calibrating a position and energy calculation unit of nuclear medicine camera to calculate a parameter of a radiation event, comprising:

programming the calculator to a first level of precision, without exposing the calculator to radiation events; and exposing the calculator to a plurality of radiation events.

Preferably, programming comprises providing an at least partially calibrated programming. Further preferably, providing an at least partially calibrated programming comprises copying said programming from a second nuclear medicine camera.

Alternatively or additionally, providing an at least partially calibrated programming comprises providing said programming from a different configuration of the nuclear medicine camera. Preferably, said different configuration comprises a configuration before replacing photomultiplier tubes. Alternatively or additionally, said different configuration comprises a configuration using a different collimator.

Alternatively or additionally, the method comprises simulated exposing of said calculator to a simulated plurality of overlapping radiation events after said exposing the calculator. Preferably, said simulated exposing comprises generating simulated overlapping events from individual events.

In a preferred embodiment of the invention, said calculator comprises a neural network.

There is also provided in accordance with a preferred embodiment of the invention, a method of calibrating a nuclear medicine camera, comprising:

providing a camera; and periodically calibrating the camera, based on a previous calibrated state of the camera, which calibrating is exclusive of gain setting for individual PMTs of the camera.

Preferably, calibrating comprises calibrating a neural network portion of the camera. Alternatively or additionally, periodically calibrating comprises calibrating linearity corrections. Alternatively or additionally, periodically calibrating comprises calibrating energy corrections. Alternatively or additionally, periodically calibrating comprises calibrating more often than four times a year. Alternatively or additionally, periodically calibrating comprises calibrating at least once a month. Alternatively or additionally, periodically calibrating comprises calibrating at least once a week.

There is provided in accordance with another preferred embodiment of the invention, a collimator kit for a nuclear medicine camera, comprising:

a collimator; and a programmed calibration for the combined camera and collimator.

There is further provided in accordance with a preferred embodiment of the invention, a collimator kit for a nuclear medicine camera, comprising:

a collimator; and a programmed calibration for camera-independent sensitivity errors of the collimator.

Preferably, the kit comprises a programmed calibration for camera dependent sensitivity errors.

BRIEF DESCRIPTION OF THE DRAWINGS

The invention will be more clearly understood by the following detailed description of preferred embodiments of the invention, taken together with the drawings in which.

DETAILED DESCRIPTION OF THE PREFERRED EMBODIMENTS

The present invention is believed to be applicable to all the correction methodologies presently in use and is not limited to those systems which use triple correction. While the major utility of the invention is for the primary corrections, namely energy, geometric distortion and optionally sensitivity, it is also applicable to correction schemes which utilize only one correction (for example a flood correction) or two corrections (either dislocation/energy, dislocation/flood or energy/flood). In each of these cases specific and characteristic correction maps are determined for one or both of the corrections used. However, since a major utility of the methods of the invention is in the correction of intrinsically highly distorted systems, it is believed that a triple correction system such as those well known in the art (for example, those described in the above mentioned patents) will be required for good imaging results.

It should be appreciated that while there are preferred methods, described herein, for applying the invention to existing correction schemes, the corrections themselves may be performed in many different ways.

Figure 1:
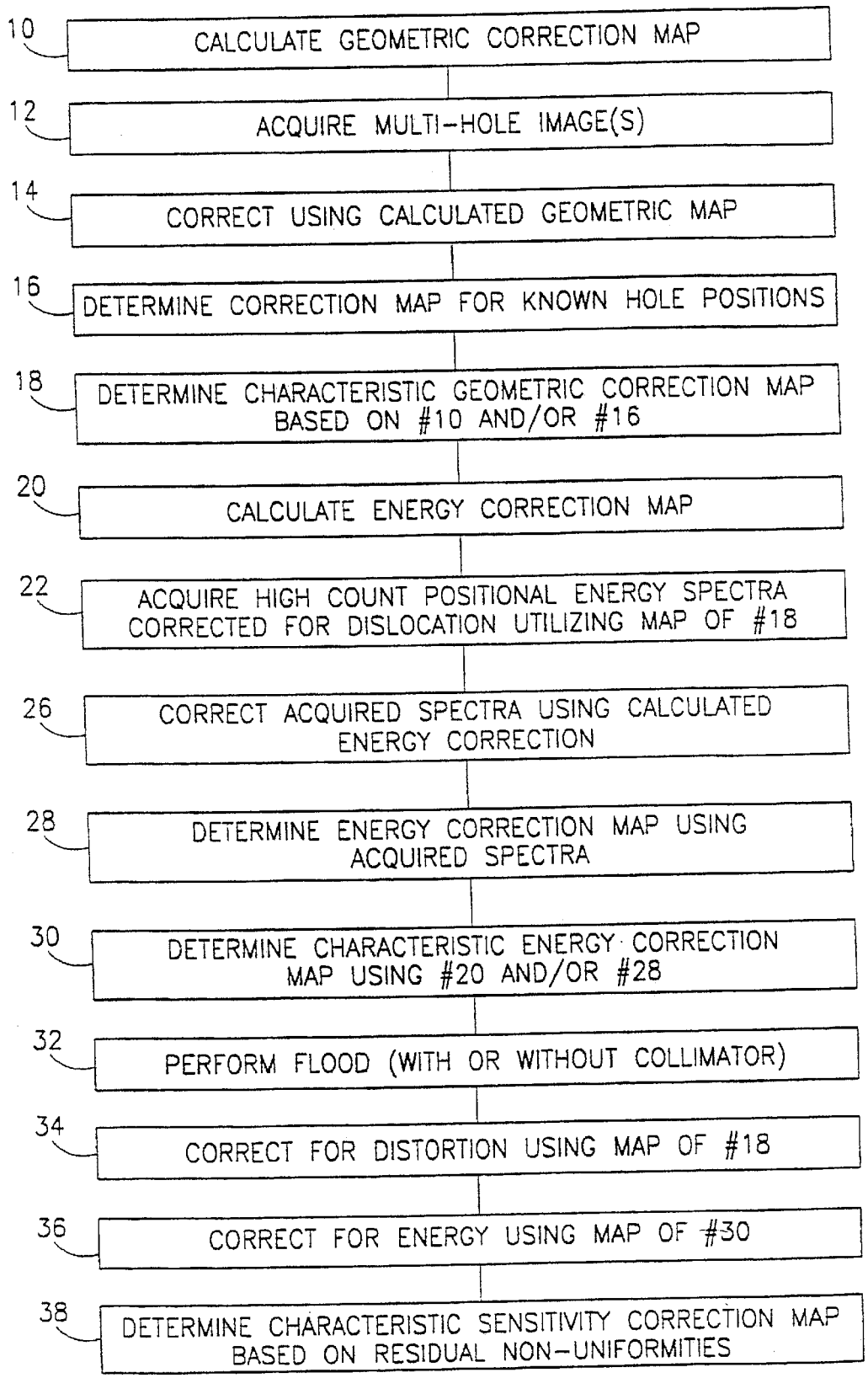
FIG. 1 is a flow chart for determining characteristic geometric, energy and sensitivity correction maps in accordance with a first preferred embodiment of the invention.

FIG. 1 is a flow chart of a preferred method for determination of the characteristic correction maps for a first correction system which utilizes a triple correction. In this preferred method, the dislocation correction is determined first. Preferably, the starting point for the correction is a geometric correction map based on the geometry of the camera (10). It is well known that the gross dislocation of a camera can be determined based on purely geometrical considerations. In some cases, this calculated map may be used as the characteristic map. Alternatively or additionally, the map is determined using a geometric correction map based on an image of a hole phantom (alternatively imaged at a two dimensional lateral plurality of positions) (12). The positions of the imaged holes are used to determine the geometric correction map by any of the methods well known in the art (16). In the preferred embodiment shown in FIG. 1, the acquired image is first corrected using the calculated corrections (14). Preferably, this correction is performed on the fly, on an event by event basis. This reduces the size of the required correction which must be determined from the images and hence the number of positions of the phantom which must be imaged and the number of counts required for imaging. These corrections (16) preferably form the basis for the characteristic geometric correction map (18). Alternatively, the calculated geometric map may, under certain circumstances be used as the characteristic correction map if it is determined that it is accurate enough to act as the basis for the specific map. Alternatively, no calculation is made and the characteristic geometric correction map is based only on a high count, multi-position image of the multi-hole plate. It should be appreciated that there is a tradeoff between the accuracy of the calculated geometric map and the required distance between holes in a multi-hole plate. As the accuracy of the calculated geometric map increases, the required distance between holes decreases, preferably to a point where no movement of the multi-hole plate is necessary to achieve a reasonable calibration.

Since dislocations are expected to be high and to have a relatively high spatial frequency component, it is preferable to determine the corrections utilizing a multi-hole plate utilizing dislocation information determined from a plurality of lateral positions of the plate. This allows for the determination of actual dislocation with great accuracy. The number of counts utilized is consistent with the actual magnitude of the dislocations and the accuracy desired and the number is generally very high. Alternatively, a plate with parallel slits may be used, first in one orientation, to determine distortions in a first direction and then in the perpendicular orientation, to determine distortions in the perpendicular direction. In the instant application, most of the embodiments are described as using a multi-hole plate, however, it will be appreciated by a person skilled in the art, that the same embodiments may be practiced using a calibration plates having parallel slits and other calibration plate types known in the art.

To determine the characteristic energy correction map, a preferred first step is the calculation of an energy correction map based on geometric considerations (20). Preferably, this map is based on the actual geometry of the camera. Calculation of this map is not absolutely necessary; however, as with the geometric correction, using it as the starting point reduces the magnitude of the corrections which must be determined experimentally and reduces the number of counts and positions necessary for data acquisition for determining the maps.

High count positional spectral data is acquired from a flood (22). The position of the events which go into forming this data are corrected for position, using the characteristic geometric correction map, preferably on an event-by-event basis and then, optionally, utilizing the calculated energy correction (26). The thus acquired and corrected spectra are used to determine energy correction factors by any of the methods well known in the art (28). As with the dislocation correction, the characteristic energy correction map (30) may be either the calculated map, a map based only on spectral data and not on any geometrically derived correction of data or, preferably, on a map based on acquired spectral data which has been first corrected by the geometrically calculated energy correction.

The third correction, the sensitivity correction, is preferably determined in the standard fashion by performing a flood (32). This flood data is corrected for distortion (34) using the characteristic geometric correction map (18) and then for energy (36), using the characteristic energy correction map (30). A characteristic sensitivity correction map is then determined (38) from the residual non-uniformities in the corrected flood image in any of the ways well known in the art.

Figure 2:
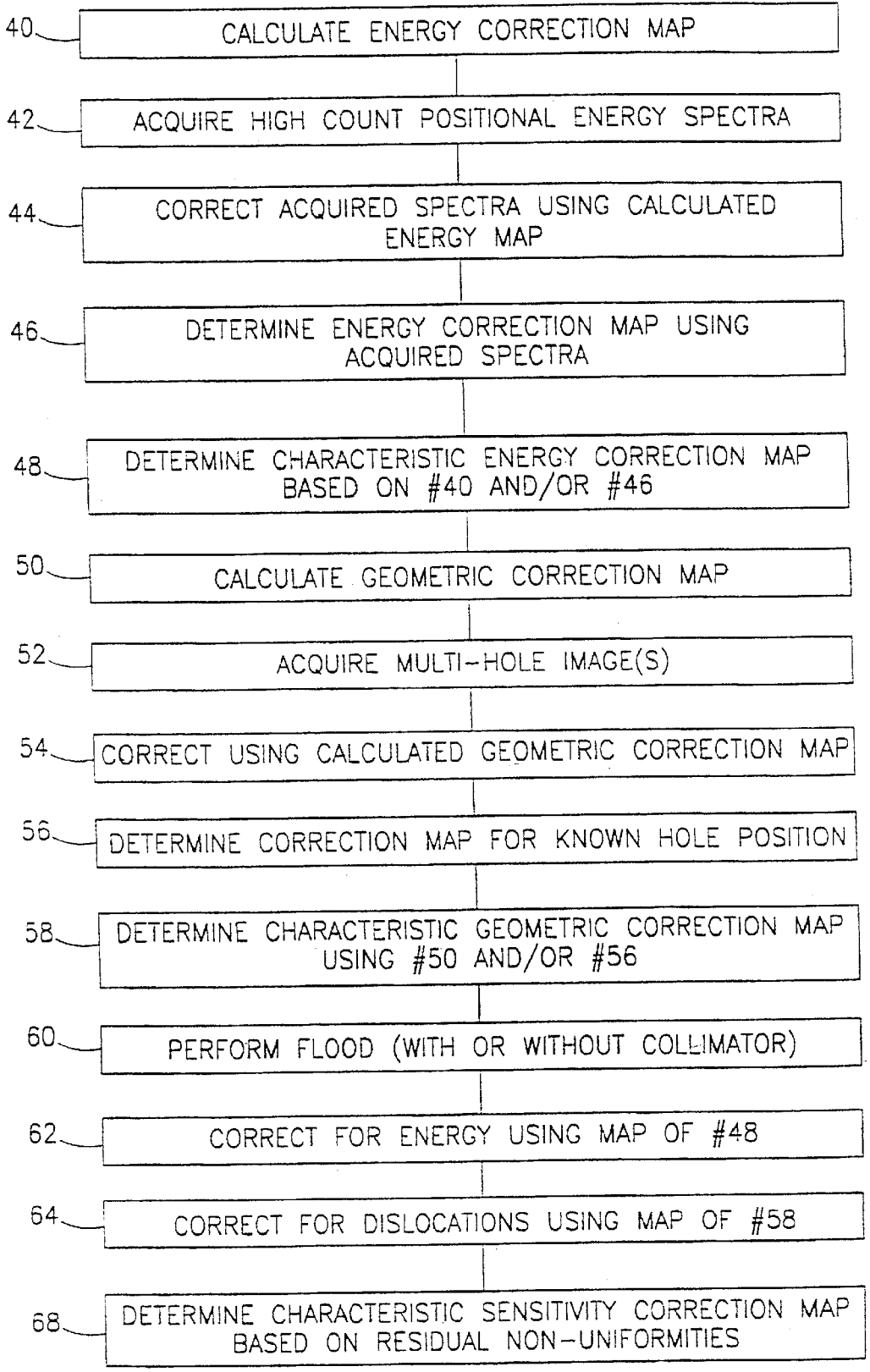
FIG. 2 is a flow chart for determining characteristic geometric, energy and sensitivity correction maps in accordance with a second preferred embodiment of the invention.

FIG. 2 is a flow chart of an alternative method of determining the geometric and energy correction maps. In this method, the steps are similar to those of the method of FIG. 1 except that the energy is not corrected for positional displacement errors. The derived energy and geometric correction maps are shown as being derived sequentially, however, they can be derived in either order. As will be seen below, the maps generated by the methods of FIGS. 1 and 2 are applied differently to actual image data.

As indicated above, the characteristic energy and geometric maps for either method may be based on experimental data from a specific camera, in which case the maps are specific to that camera, or they may be based on averaged data from a number of cameras or from a single "representative" camera, if the variation between cameras is sufficiently small. The characteristic sensitivity correction map is generally based on individual measurements of camera and, preferably, also of collimator. Thus, the sensitivity correction map will vary depending on the choice of collimator. Alternatively, the sensitivity may be measured without a collimator and the sensitivity data for the collimator and camera combined to form a single characteristic sensitivity correction map. Preferably, the resulting combined map is incrementally calibrated. Alternatively, two separate maps may be sequentially applied to the data. However, for some methods of applying the correction, sequential application may result in somewhat poorer signal to noise ratios.

In one preferred embodiment of the invention the sensitivity correction is divided into two (or three) parts. A first part is the portion of the correction which is specific to a particular collimator. This correction is determined for the collimator and is utilized by the camera whenever the particular collimator is used. The second portion of the correction corrects for distortions caused by incomplete correction by the linearity and energy corrections, resulting in residual non-uniformity. Optionally, the sensitivity correction comprises a third portion, which corrects for distortions caused by non-uniform sensitivity of the scintillator crystal to incoming radiation. Alternatively, this portion may be included in the second portion. In a preferred embodiment of the invention, the first correction is determined separately of the camera on a per collimator basis. A flood image is first corrected for linearity and energy. The corrected flood is then used as the basis for a first sensitivity correction. The flood used for determining this correction can be acquired using a point source, giving a highly accurate correction. In use this first correction is combined with the collimator correction to give an overall sensitivity correction. The advantage of this procedure is that a point source flood can be used to acquire the image needed for the first sensitivity correction, while a sheet source would be needed for determining the sensitivity correction if the sensitivity is determined for the camera including the collimator. A sheet source flood is generally more difficult to perform and the radiation is generally less uniform.

Figure 3:
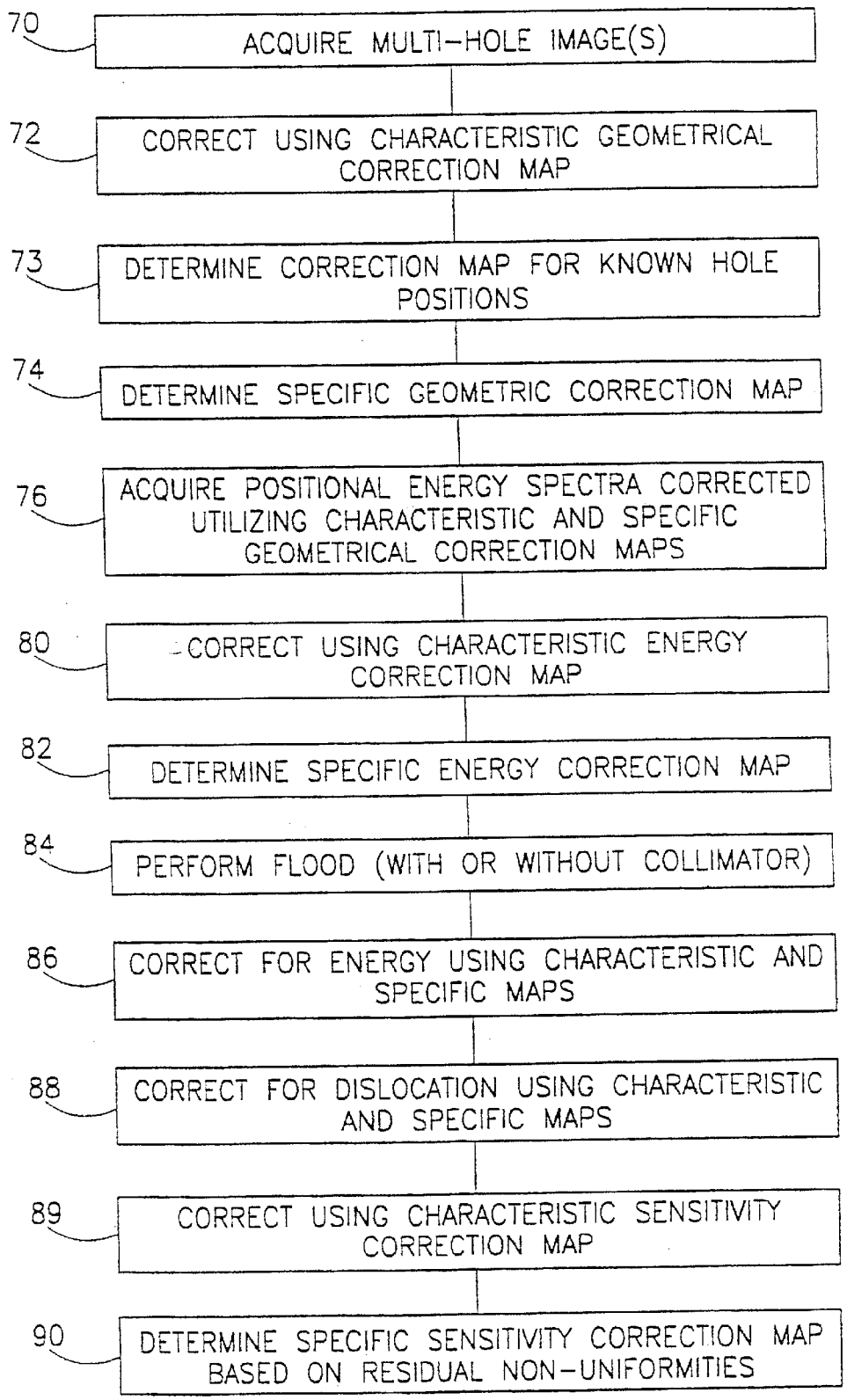
FIG. 3 is a flow chart for determining specific geometric, energy and sensitivity correction maps in accordance with the first preferred embodiment of the invention.

FIG. 3 is a flow chart showing the determination of the specific correction maps for a gamma camera in accordance with a preferred embodiment of the invention, based on the characteristic correction maps determined according to FIG. 1. It is expected that the specific correction maps will be generated after installation, periodically during use or whenever it is perceived that image quality may have deteriorated, as for example, after a minor repair or after a deterioration in a test image is perceived, or when the collimator is replaced (if the sensitivity correction is determined with the collimator in place).

First a multi-hole image is acquires (70). Since the additional corrections based on this measurement are expected to be small, the measurement may be made for only a single or a more limited number of lateral positions of the multi-hole phantom. Alternatively or additionally, only a relatively small number of counts need be acquired. The multi-hole image is corrected for position using the characteristic geometric correction map (72). Any remaining dislocations are utilized to form a specific geometric correction map (74). Next positional energy spectra are acquired (76) and corrected using the characteristic and specific geometric correction maps, preferably on an event by event basis and preferably on the fly. As with the position correction, the positional energy spectra may have relatively low spatial and/or statistical resolution, since the correction is expected to be small.

The acquired spectra are next corrected by the characteristic energy correction map (80) and the corrected data are used to form a specific energy correction map (82). A flood is acquired (84), corrected for energy (86) and dislocation (88) using both the characteristic and specific maps. This corrected flood image is then corrected by the characteristic sensitivity correction map (89) to form a corrected flood image. Any non-uniformities in this image form the basis for a specific sensitivity correction map (90). Alternatively, the characteristic sensitivity map is not used and a sensitivity map is calculated each time the camera is calibrated.

It should be understood that, when used for correction of data, the specific and characteristic maps may be combined into a single map, which is then applied to the data.

Figure 4:
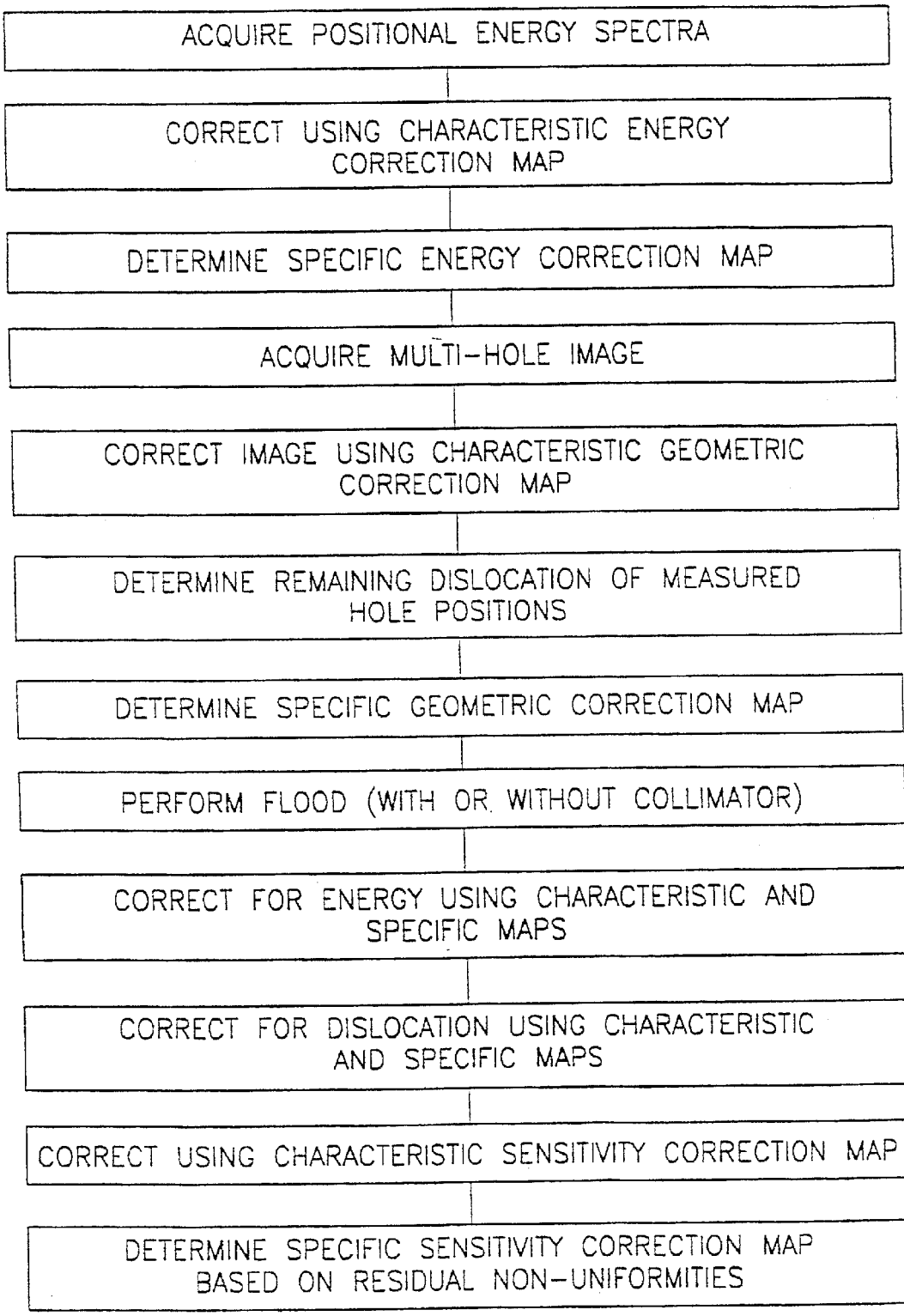
FIG. 4 is a flow chart for determining specific geometric, energy and sensitivity correction maps in accordance with the second preferred embodiment of the invention

FIG. 4 is a flow chart showing the determination of the specific correction tables for a gamma camera in accordance with a preferred embodiment of the invention, based on the characteristic correction maps determined according to FIG. 2. Positional energy spectra and Multi-Hole images are acquired as in the method of FIG. 3. These are shown as being acquired sequentially in FIG. 4, however, they can be acquired independently or in any order. The energy spectra are corrected using the characteristic energy correction map and any remaining spectral non-uniformity forms the basis for a specific energy correction map. The Multi-hole image is corrected using the characteristic geometric correction map and any remaining dislocation is used to generate a specific geometric correction map. A flood image is acquired and is corrected for energy and Dislocation (generally in that order) using the characteristic and specific energy correction maps and the characteristic sensitivity correction map. Any resulting non-uniformity is used to generate a specific sensitivity correction map.

In a preferred embodiment of the invention, the determination of the respective characteristic map or maps is repeated if the corrections required in the corresponding specific map is greater than a given limit.

Alternatively or additionally, the basis for determination of a new specific correction map is the characteristic map and the last previous specific map. The so determined specific map is merged into previous specific map to form a new specific map. In an alternative version of this method, the successively determined specific maps are continuously merged into the characteristic map to form a single map, which is always the basis for additional incremental corrections maps which are then once more merged into the previous map.

Furthermore, the determination of a new specific map may be made for only one or two of the corrections, with the old map or maps being used for the other corrections.

The maps generated by the methods shown in FIGS. 1 and 3 are applied to acquired imaging data by first correcting the data using the characteristic and specific geometric correction maps (either in tandem or by utilizing a combined map). The geometrically corrected data is then energy corrected using the characteristic and specific energy correction maps (either in tandem or by utilizing a combined map). The geometric and energy corrected data is then corrected using the characteristic and specific sensitivity correction maps.

The maps generated by the methods shown in FIGS. 2 and 4 are applied to acquired imaging data by correcting the data using the characteristic and specific energy correction maps (either in tandem or by utilizing a combined map) and the characteristic and specific geometric correction maps (either in tandem or by utilizing a combined map). These two sets of correction maps can either be applied in tandem to the data (with the energy correction being applied first) or they can be applied in parallel, taking care that the position of the events is uncorrected when the energy correction is applied. The energy and geometrically corrected data is then corrected using the characteristic and specific sensitivity correction maps (either in tandem or by utilizing a combined map).

The methods of applying the invention given in this specification are based on the most common methodologies used for correction of data in Gamma Cameras. Furthermore, the invention is described as being applied to each of the three elements of the triple correction. It should be understood that the invention is also applicable to any of the methods known in the art, in which gamma camera corrections are made using a single or dual set of correction maps as well as systems which correct using more than three correction maps. Furthermore, not all the correction maps need be derived using the two step method described, and it may be advisable, depending on the amplitude and stability of the various corrections, to apply a single step process to one or more of the corrections which are made.

Another aspect of the invention relates to using a neural network (NN) to perform the entire calculation, including the above described corrections. Such a NN can be incrementally calibrated in a manner similar to using incremental correction maps, described above.

Figure 5:
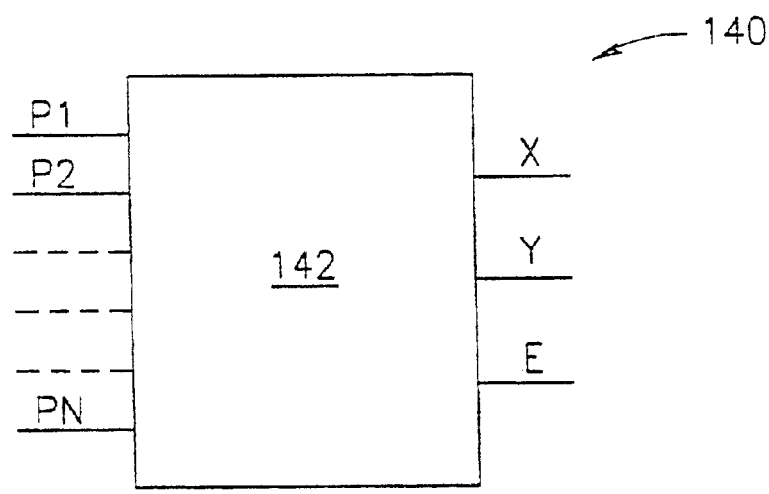
FIG. 5 is a schematic illustration of a neural network position and energy calculator in accordance with a preferred embodiment of the invention.

FIG. 5 is a schematic illustration of a neural network position and energy calculator 140 in accordance with a preferred embodiment of the invention. Calculator 140 includes a plurality of inputs $p_1$ through $p_n$ each of which carries the response of a single PMT to an event and a plurality of outputs x, y and E. A neural network (NN) 142 generates a unique set of values (x, y and E) for each set of inputs $p_1$ through $p_n$. In a preferred embodiment of the invention, NN 142 is a feedforward network. The network may be implemented using a hardware network or it may be implemented in software. In a hardware implementation, the network may be a digital network or an analog network.

In a preferred embodiment of the invention, inputs $p_1$ through $p_n$ are integrated responses of PMTs, which are integrated over an entire event or a major portion of the event. In an alternative embodiment of the invention, inputs $p_1$ through $p_n$ are unintegrated responses of PMTs. In this embodiment, each of inputs $p_1$ through $p_n$ preferably comprise a plurality of input lines, each line corresponding to a sample of the PMT response. For example, if the PMT response has 16 samples, input $p_1$ will comprise 16 individual inputs lines.

Figure 6:
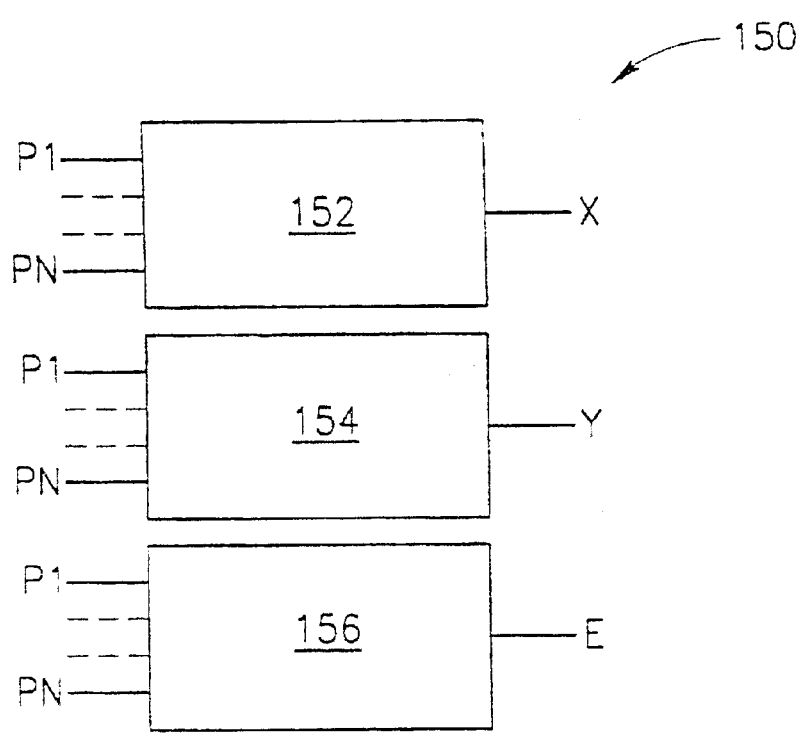
FIG. 6 is a schematic illustration of a neural network position and energy calculator having multiple parallel neural networks.

FIG. 6 is a schematic illustration of a neural network position and energy calculator 150 having multiple parallel neural networks 152, 154 and 156. Each of the individual networks 152, 154 and 156 receive input from all of the PMTs and outputs only a subset, preferably one, of all the values calculated by calculator 150. Each of NNs 152, 154 and 156 may be implemented on a separate circuit and they may be operated in parallel. in addition, all the NN may be trained in parallel or individually. This type of structure is especially useful when the gamma camera is calibrated using two plates which have slits in the X and Y direction respectively. In such a case, each NN of NNs 152 and 154 may be trained individually.

In a preferred embodiment of the invention, where plates with parallel slits are used for calibration, a single NN is used to calculate both X and Y positions and/or linearity corrections. The NN is trained first using only one direction of strips and then the NN is trained for the perpendicular direction, using the known location in the first dimension as fixed points.

In accordance with another preferred embodiment of the invention, two NNs are operated in series. For example, a first NN can calculate the position and a second NN can correct linearity errors and/or other errors.

In accordance with another preferred embodiment of the invention a NN correction mechanism is used in conjunction with another type of position calculator, such as an Anger-type calculator. Thus, a NN may be used to replace a map-based correction system. In another preferred embodiment of the invention, a NN is used in conjunction with a solid-state detector, for example, as described in PCT patent application IL96/00164, titled "Solid State Gamma Camera" and filed on Nov. 24, 1996, by applicant Elscint et. al, the disclosure of which is incorporated herein by reference.

Figure 7:
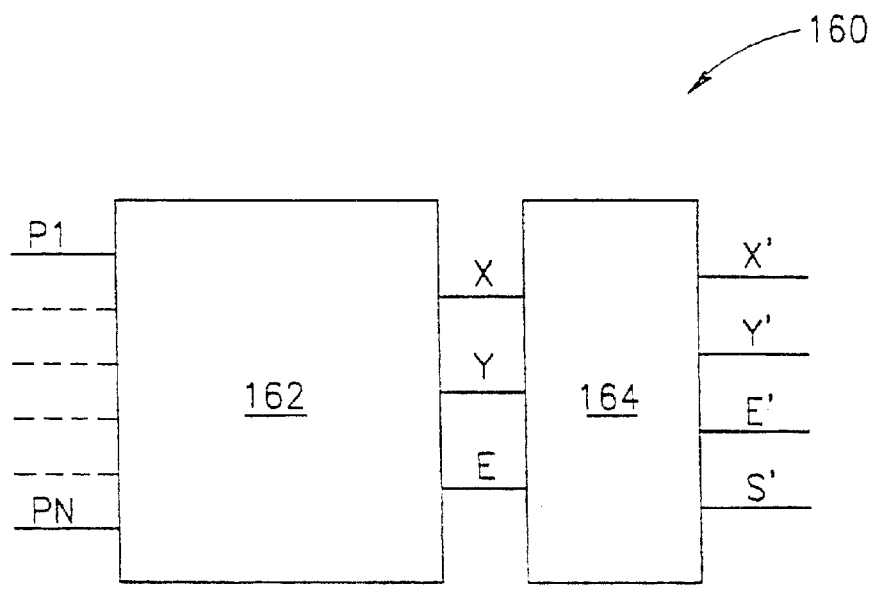
FIG. 7 is a schematic illustration of a neural network used in combination with another type of position and energy calculator, in accordance with a preferred embodiment of the invention.

FIG. 7 is a schematic illustration of a neural network 164 used in combination with another type of position and energy calculator 162, in accordance with this preferred embodiment of the invention. In this embodiment, NN 164 is used to correct errors in values calculated by another type of calculator, such as an Anger type calculator. Thus, NN 164 is used instead of linearity correction maps and the like. Alternatively or additionally, NN 164 supplements calculator 162 by correcting errors which are not otherwise handled by calculator 162. In one example, calculator 162 includes a linearity correction map but does not include energy correction. In another example, NN 164 calculates a sensitivity correction. Alternatively or additionally, NN 164 calculates values which are not calculated by calculator 162. For example, if calculator 162 does not calculate the energy value, NN 164 can be used to calculate the energy value based on the PMT responses. Thus, a NN can be used to correct errors and/or to calculate values from raw data or from processed data.

As can be appreciated, the use of a NN is not limited to calculating position and energy, but also includes sensitivity correction. Further, a NN can be used to correct for machine specific errors, such as errors related to a moving radiation source, a moving detector or rotating detectors. In particular, a NN can correct for the error generated by the sagging of the detectors, detector motion and detector angle. This will usually require additional inputs for the NN: the position of the detector, its angle and/or a measured sag (at least for the training session).

A NN calculates a position in a very different manner from the center-of-gravity method of Anger. As a result, NNs are better suited to handle edge effects, which are notoriously non-linear. Preliminary simulations have shown that a NN calculator, in accordance with a preferred embodiment of the invention increases the field-of-view of a nuclear medicine camera up to the physical limit of the detector. It should be noted that there is no need to have a predetermined model of the PMTs of the detector in order to perform highly non-linear corrections with a NN. Thus, a NN based correction or calculation can easily accommodate unusual PMT geometries, for example, with a (small) portion of the crystal uncovered by a PMT, such as due to a structural defect or a connector. Another example of such a highly non-linear system is a system using any desired combination of large and small PMTs, the small PMT being used as fillers or in regions where a higher resolution is desired.

Another benefit of position calculation using a MN is the correction of position and sensitivity errors caused by variations in the incidence angle of gamma photon to the detector crystal in a fan-beam collimator.

A calibration process for NN in accordance with a preferred embodiment of the invention preferably uses a multiple-hole mask to mask a uniform irradiation of detector crystal 116. Such a mask has a plurality of narrow holes at known locations on the mask. The mask is placed between a slow, uniform, source of radiation and detector 116. Optionally, collimator 115 is placed between the mask and detector 116. When a radiation event occurs in the radiation source, it passes through (at most) one of the plurality of holes and impinges on crystal 116. Since an approximate localization of the event can be performed even in an uncalibrated system the event can usually be associated with a particular hole in the mask. The error in the localization can then be determined by comparing the detected position and the known location of the hole in the mask. The radiation source has a relatively low rate of event generation, so that the probability of two simultaneous events is negligible. As noted above, a plate with parallel strips may be used instead of a multi-hole plate.

It should be noted that the programming of a NN is not adversely affected by an occasional error in a stimulus. In a preferred embodiment of the invention, the programming of the NN is directed to minimize the linearity $L=\Sigma\{(x_{measured}-x_{true})^2+(y_{measured}-y_{true})^2\}$, where $x_{true}$ is the x position of the hole and $x_{measured}$ is the position output by the NN (the notation is also used for the y coordinate). In a preferred embodiment of the invention, the mask is moved periodically to provide a more uniform irradiation of detector crystal 116.

Two stages can be identified in the training of a NN. A first, slow conversion, stage, in which the NN slowly approaches the function which maps its input to its output; and a second, fast conversion stage, in which the NN is fine tuned to the particular function. The first stage generally corresponds to the "characteristic" correction map described above and the second stage generally corresponds to the "specific" correction map described above. One reason for the correspondence not being exact is that the NN continues to learn the characteristic function even while it is learning the specific function.

In a preferred embodiment of the invention, the first stage of training is done only once for an entire group of nuclear medicine systems. The results of the training are used as a starting point for the second stage of training on individual machines. In a preferred embodiment of the invention, the first stage of training is performed using a computer simulation of the camera. Other methods of incremental correction map generation and usage are described in "Medical Imaging System Incorporating Incremental Correction Maps", filed by the assignee of the instant application in the Israel Patent office on Oct. 27, 119,497, the disclosure of which is incorporated herein by reference.

When PMTs are replaced in a nuclear medicine camera, the calibration of the camera is no longer valid. In a preferred embodiment of the invention, the previous programming of the NN is used as a starting point for retraining the NN. Since the calibration of the camera after the replacement is not very different from the previous calibration, the training of the NN to the new configuration, based on the old one, is rapid.

In a preferred embodiment of the invention, when a new collimator is supplied for the camera, the camera is supplied with a NN which has been trained to at least the first stage for the new collimator. Preferably, this NN is supplied as a software file on a diskette. The NN may include calibration only for the collimator or, alternatively, for the camera-collimator combination. In an alternative preferred embodiment of the invention such a supplied calibration comprises a map, rather than a NN. It should be appreciated that a supplied calibration can also be provided with other components of a gamma camera and be trained for corrections other than sensitivity. For example, a supplied calibration may be supplied with a detector crystal or a camera and may include corrections for linearity errors.

Another aspect of calibration relates to recalibrating the camera at frequent intervals to compensate for deterioration of the PMTs. Typically, a PMT is replaced after a certain number of hours of use, after it burns out or when its amplification is reduced below a preset level. However, even before the PMT is so deteriorated that it must be replaced, the changes in its response adversely affect the determination of energy of events and their position, thereby degrading the image quality of the camera. Since performing a map calibration on a nuclear medicine system is very time consuming (usually a few days long), it is not considered practical to recalibrate correction maps camera on a very regular basis, such as once a week. However, the deterioration of the PMT is gradual, so calibrating the gain of the PMTs is a relatively short procedure which can be performed regularly.

In accordance with a preferred embodiment of the invention, a NN is retrained often. Preferably, such training is done in addition to or even instead of calibrating the gain of the PMTs. In a preferred embodiment of the invention, the linearity correction is calibrated as often as three times a year, once a month or even, preferably, once a week. It should be appreciated that such frequent calibration may not be necessary for each distortion corrected mechanism. In a preferred embodiment of the invention, not all the distortion correction mechanisms are calibrated each time a calibration is performed. For example, in one calibration period, linearity corrections are calibrated and in another calibration period, multiple Compton scatter corrections are corrected. Preferably, PMTs are replaced less often, since a (non-linear) degradation in a PMT response does not require a lengthily recalibration of the system nor does it significantly reduce the resolution of the camera.

In a preferred embodiment of the invention, a NN is used to calibrate a multi-energy camera. A NN for a multi energy system is preferably programmed over several sessions, one with each radiation energy. Alternatively, if the energy discrimination is precise enough in an uncalibrated camera, different event energies may be mixed and the programming can proceed as described above with respect to multi-hole position determination, where events from different hole are correctly assigned to the holes, since even the raw positioning is exact enough for hole differentiation. Preferably, in such an embodiment, the NN includes one or more outputs which classify the type of detected event, i.e., what energy type, whether it is a Compton scatter event, a temporally overlapping event and the like. Additionally, such a classification output may be used instead of or in addition to the energy output. Thus, the NN can assign the event to one of a plurality of energy windows, instead of providing a raw energy value.

Figure 8:
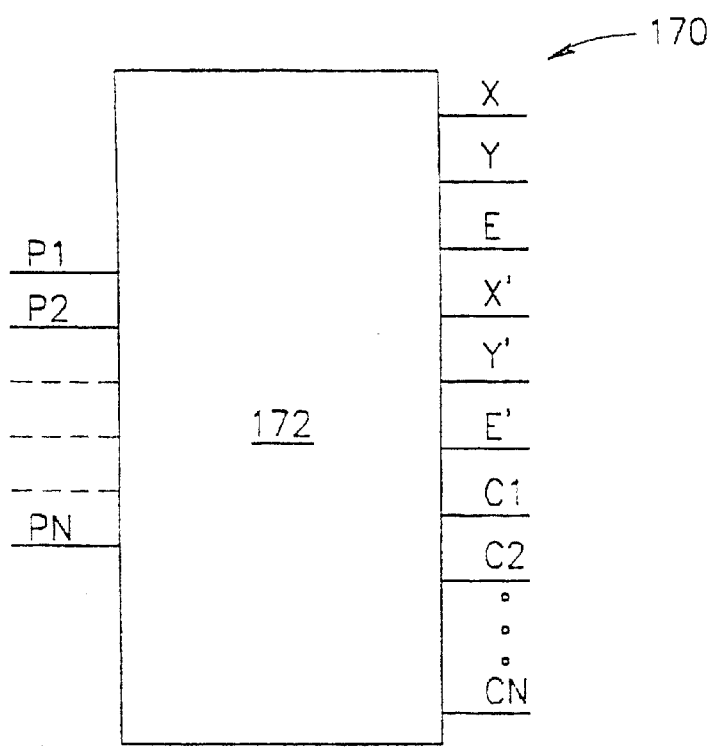
FIG. 8 is a schematic illustration of a neural network position and energy calculator which detects simultaneous events or Compton scatter events and which includes optional classification outputs.
Figure 9:
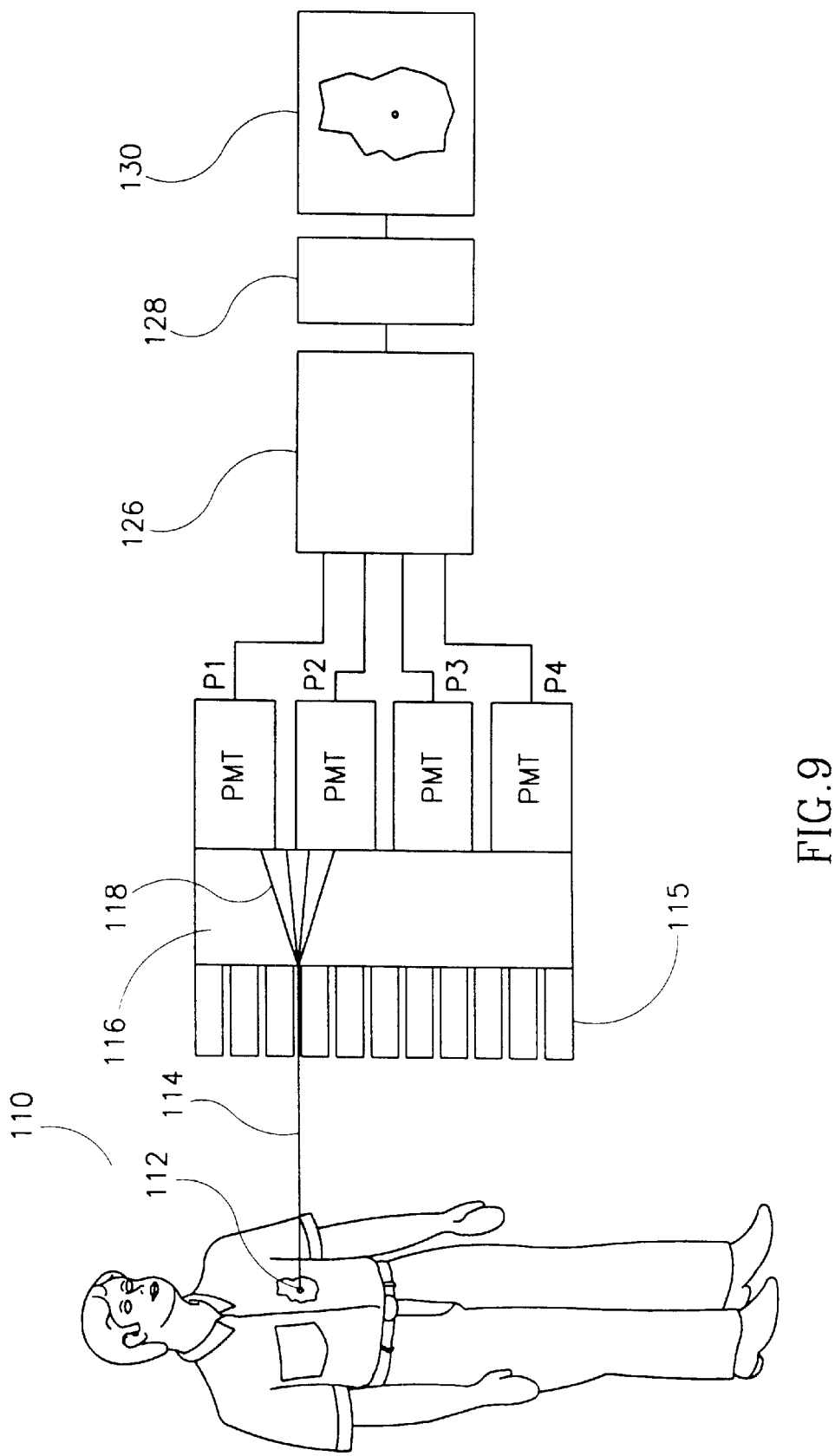
FIG. 9 is a schematic illustration of an Photo-multiplier based nuclear medicine camera

Another aspect of the present invention relates to using a NN to discriminate between two temporally overlapping events. FIG. 8 is a schematic illustration of a neural network position and energy calculator 170 which detects simultaneous events or Compton scatter events and which includes optional classification outputs C1 . . . CN. When two gamma photons interact with crystal 116 substantially simultaneously, there may be a problem in detecting the existence of two interaction events. As a result, the two events are generally treated as a single, high energy event and discarded. If the spatial separation of the two events is large enough, they each affect different PMTs. However, in many nuclear medicine systems, all the PMT responses are processed together to determine a single radiation event, so that two events cannot be separated.

In a preferred embodiment of the invention, a NN analyzes the PMT responses and detects if more than one spatially separated events occurred. Preferably, the NN is provided with two or more sets of {x, y, E} outputs, one designated as primary and another as secondary. The NN is then trained to generate only a primary {x, y, E} output on single events and to generate additional secondary {x', y', E'} outputs when more than one event occurs simultaneously. Alternatively, the MN separates out only one of the two (or more events), however, the separated even is localized with a high precision. In a preferred embodiment of the invention, the NN detects Compton events in the crystal and/or scatter events in the body. In a preferred embodiment of the invention, a NN is trained to recognize temporally overlapping and/or spatially overlapping events.

Since generating two simultaneous gamma photons is technically difficult, in a preferred embodiment of the invention, simultaneous events are simulated by combining two or more PMT response sets from individual events and feeding them directly into the NN. For Compton events, one or both of the response sets is preferably scaled to a lower energy and/or to a different temporal profile. Alternatively or additionally to feeding signal directly to the NN, the simulated data may be fed via the PMTs by illuminating the PMTs with programmed light pulses. Preferably, training for simultaneous events is performed after training for individual events. Alternatively, training for single and double events is intermixed. Periodic training may be interleaved, i.e., one week single events are trained and the next week multiple events are trained.

Alternatively to using simulated responses, a NN may be trained, at least in the first stage, on a gamma camera which is capable of discriminating overlapping events, Compton events, and other difficult event types. The "correct" identification of events by the discriminating camera is used to train the NN. As a result, a gamma camera which incorporates the NN may not require electronics (pulse shapers, integrator) which are as fast as a highly discriminating gamma camera, since the discrimination is performed by the NN and not by separately sampling and integrating close events.

Another aspect of the invention relates to calibrating a gamma camera for one energy level and then incrementally calibrating the camera for a different energy level. Typically calibration for each energy level is different, since the average depth of interaction inside the detector crystal depends on the energy level. Such incremental calibration may be implemented using incremental correction maps or by incremental calibration of a NN.

Other variations in the application of the principles of the invention will be apparent to a person of skill in the art and the disclosure of the preferred embodiments is not meant to be limiting to the scope of the invention which is defined only by the following claims.

What is claimed is:

1. A method of correcting imaging data in a Gamma Camera comprising:
   determining a first energy, dislocation, sensitivity or flood type correction map of the gamma camera based on one or both of (1) calculated corrections and (2) a first data acquisition at a given energy;
   determining a second correction map of a same type as said first correction map of the gamma camera based on a second data acquisition at the given energy; and
   correcting the imaging data based on the first and second correction maps, wherein the maps are additional to any PMT gain correction.

2. A method according to claim 1 wherein the first correction map is based on a data acquisition.

3. A method according to claim 2 wherein the first correction map is based on a data acquisition made on a plurality of gamma cameras.

4. A method according to claim 2 wherein the first data acquisition is a relatively high count acquisition and the second acquisition is a relatively low count acquisition.

5. A method according to claim 2 wherein the first data acquisition is made at a relatively high spatial acquisition and the second data acquisition is made at a relatively low spatial resolution.

6. A method according to claim 1 wherein the first correction map is based on calculated corrections.

7. A method according to claim 6, wherein the first correction map is based on both calculated corrections and a data acquisition.

8. A method according to claim 1 wherein the second correction map is determined periodically.

9. A method according to claim 8 wherein the second correction map is determined without predetermining the first correction map.

10. A method according to claim 8 wherein the second correction map is combined with a prior correction map to determine a new correction map.

11. A method according to claim 10 wherein the prior correction map is a prior second correction map and wherein the new correction map is a new second correction map.

12. A method according to claim 1 wherein the second correction map is determined in response to perceived errors in an image produced by the camera.

13. A method according to claim 1 wherein the second correction map is made after installation of the gamma camera.

14. A method according to claim 1 wherein the first and second correction maps are combined to form a combined correction map which is used to correct the acquired data.

15. A method according to claim 1 wherein the imaging data is corrected by a plurality of correction maps which correct for different errors in the data.

16. A method according claim 1 wherein the correction map comprises an energy correction map.

17. A method according to claim 1 wherein the correction map comprises a dislocation correction map.

18. A method according to claim 1 wherein the correction map comprises a sensitivity correction map.

19. A method according to claim 1 wherein the correction map comprises a flood correction map.

20. A method according to claim 1, wherein the first correction map comprises a combined correction map of at least two previous correct on maps for a same type of error correction.

21. A method according to claim 1, wherein the first correction map and the second correction are base on different photon energies.

22. A method according to claim 1 for correcting an acquired image on a gamma camera of a type having at least one type of distortion, said type of distortion having a first portion that is characteristic of the type of gamma camera and a second portion specific to each gamma camera, and wherein:
   determining a first correction map comprises determining a first correction map to correct for the characteristic distortions of the at least one type; and
   determining a second correction map to correct for specific distortions of a same at least one type.

23. A method according to claim 1 wherein the first correction map is determined based on calculated corrections, without a data acquisition on the gamma camera being calibrated.

24. A method of calibrating a position and energy calculation unit of nuclear medicine camera to calculate a parameter of a radiation event, comprising:
   programming the calculation unit to correct position and energy calculations for distortions thereof, caused by characteristics of the camera, to a first, relatively lower level of accuracy, without exposing the camera to radiation events;
   exposing the camera to a plurality of radiation events; and
   calibrating the calculation unit to correct the position and energy calculations for distortions thereof to a second, relatively higher level of accuracy, based on responses of the camera to said plurality of radiation events.

25. A method according to claim 24, wherein programming comprises providing programming that at least partially calibrates the camera for intrinsic distortions.

26. A method according to claim 25, wherein providing an at least partially calibrated programming comprises generating said programming based on calibration of a second nuclear medicine camera.

27. A method according to claim 25, wherein providing an at least partially calibrated programming comprises generating said programming based on a nuclear camera having a configuration different from that of the nuclear medicine camera being calibrated.

28. A method according to claim 27, wherein said different configuration comprises a configuration before replacing photomultiplier tubes.

29. A method according to claim 27, wherein said different configuration comprises a configuration using different collimator.

30. A method according to claim 24, comprising simulated exposing said calculation unit to a simulated plurality of overlapping radiation events after said exposing.

31. A method according to claim 30, wherein said simulated exposing comprises generating simulated overlapping events from individual events.

32. A method according to claim 24 wherein the calculator comprises a neural network.

33. A method of calibrating a nuclear medicine camera, comprising:
   providing a camera having a first energy, dislocation, sensitivity or flood type calibration; and periodically recalibrating the camera to produce a second calibration of at least the first type, utilizing the first calibration of the first type, which periodically calibrating is additional to changing a gain setting for individual PMTs of the camera.

34. A method according to claim 33, wherein providing comprises calibrating a neural network portion of the camera.

35. A method according to claim 33, wherein periodically calibrating comprises producing a linearity correction map.

36. A method according to claim 33, wherein periodically calibrating comprises producing an energy correction map.

37. A method according to claim 33, wherein periodically calibrating comprises calibrating more often than four times a year.

38. A method according to claim 33, wherein periodically calibrating comprises calibrating at least once a month.

39. A method according to claim 33, wherein periodically calibrating comprises calibrating at least once a week.

40. A method according to claim 33 wherein the first calibration and the second calibration are calibrations for a same energy.

41. A collimator kit for a nuclear medicine camera, comprising:
   a collimator; and
   a calibration map for camera-independent sensitivity errors of the collimator.

42. A method of correcting imaging data in a Gamma Camera comprising:
   determining a first plurality of correction maps of the gamma camera which correct for different errors in the data, said maps being based on one or both of (1) calculated corrections and (2) a first data acquisition;
   determining a second plurality of correction maps of the gamma camera that correct for the same errors as the first plurality based on a second data acquisition; and
   correcting the imaging data based on the first and second correction maps, wherein the maps are additional to any PMT gain correction.

43. A method of calibrating a nuclear medicine camera, comprising:
   providing a camera having a first calibration that corrects for errors in forming an image from acquired data; and
   periodically recalibrating the camera at least as often as a scheduled quarterly basis.

44. A method according to claim 43 wherein periodically recalibrating comprises utilizing the first calibration.

45. A method according to claim 44 wherein the first calibration and the recalibration recalibrate the camera for a same energy.

46. A method according to claim 44 wherein periodically recalibrating comprises recalibrating the camera at least as often as a scheduled monthly basis.

47. A method according to claim 46 wherein the first calibration and the recalibration recalibrate the camera for a same energy.

48. A method according to claim 44 wherein periodically recalibrating comprises recalibrating the camera at least as often as a scheduled weekly basis.

49. A method according to claim 48 wherein the first calibration and the recalibration recalibrate the camera for a same energy.

50. A method according to claim 43 wherein periodically recalibrating comprises recalibrating the camera at least as often as a scheduled monthly basis.

51. A method according to claim 50 wherein the first calibration and the recalibration recalibrate the camera for a same energy.

52. A method according to claim 43 wherein periodically recalibrating comprises recalibrating the camera at least as often as a scheduled weekly basis.

53. A method according to claim 43 wherein the first calibration and the recalibration recalibrate the camera for a same energy.

54. A method of calibrating a gamma camera for use with a plurality of collimators, comprising:
   providing at least one collimator independent sensitivity calibration for the camera; and
   providing collimator sensitivity maps for each of the plurality of collimators.

* * * * *